(12) United States Patent
Hosie et al.

(10) Patent No.: US 6,328,343 B1
(45) Date of Patent: Dec. 11, 2001

(54) RISER DOG SCREW WITH FAIL SAFE MECHANISM

(75) Inventors: Stanley Hosie, Hatton Peterhead; David Stewart Christie, Aberdeen, both of (GB)

(73) Assignee: ABB Vetco Gray, Inc., Houston, TX (US)

( * ) Notice: Subject to any disclaimer, the term of this patent is extended or adjusted under 35 U.S.C. 154(b) by 0 days.

(21) Appl. No.: 09/340,330

(22) Filed: Jun. 28, 1999

Related U.S. Application Data

(60) Provisional application No. 60/096,583, filed on Aug. 14, 1998.

(51) Int. Cl.[7] .................................................. F16L 15/00
(52) U.S. Cl. ................... 285/90; 285/123.9; 285/123.13; 285/404
(58) Field of Search ............................... 285/16, 404, 90, 285/123.9, 123.13

(56) References Cited

U.S. PATENT DOCUMENTS

| | | | |
|---|---|---|---|
| 2,086,431 | * | 7/1937 | Penick et al. ........................ 285/123.9 |
| 3,606,393 | * | 9/1971 | Huntsinger et al. ................... 285/90 |
| 3,647,245 | | 3/1972 | Hanes et al. . |
| 3,768,842 | | 10/1973 | Ahlstone . |
| 3,827,728 | * | 8/1974 | Hynes ..................................... 285/90 |
| 4,068,865 | * | 1/1978 | Shanks, II .............................. 285/90 |
| 4,606,557 | * | 8/1986 | Coffey .................................... 285/18 |
| 4,653,778 | | 3/1987 | Alandy . |
| 5,363,931 | * | 11/1994 | Moriarty .......................... 285/404 X |
| 5,607,019 | | 3/1997 | Kent . |

FOREIGN PATENT DOCUMENTS 1487948    10/1977   (GB) .

* cited by examiner

*Primary Examiner*—Teri Pham Luu
(74) *Attorney, Agent, or Firm*—Bracewell & Patterson, L.L.P.

(57) ABSTRACT

A dog-style connector with a fail-safe mechanism for a marine riser system that connects a box portion and a pin portion of a riser. An actuator housing is affixed to an external surface of the box portion. The actuator housing has an outer bore and a threaded inner bore. An actuator body is threadably received in the inner bore. The actuator body has a hex head on its first end. The actuator body has a threaded fastener bore extending from the first end for receiving a threaded fastener. The actuator body has a second end that has a stem receptacle formed therein. The fastener bore is in communication with the stem receptacle. An actuator head, which includes a flange and a stem, is provided wherein the stem is positioned within the stem receptacle for sliding engagement therewith. Threads formed on the threaded fastener engage a threaded fastener receptacle formed in the stem of the actuator head. A dog interfaces with the flange and is slidably mounted with respect to the actuator body for engaging a groove in the pin portion of a riser. A threaded fastener is provided to be threadably received in the threaded fastener bore of the actuator body.

13 Claims, 3 Drawing Sheets

RISER DOG SCREW WITH FAIL SAFE MECHANISM

CROSS-REFERENCE TO RELATED APPLICATIONS

This application claims the benefit of provisional application Ser. No. 60/096,583, filed on Aug. 14, 1998, in the U.S. Patent & Trademark Office.

PRIOR ART

In marine riser pipe systems for use in drilling underwater well bores, pipe joints are coupled to one another by connector members. A connection is made between a pin portion of a length of pipe and a box portion of a second length of pipe. The box portion of one member is adapted to telescopically fit on the pin portion of an adjacent joint. To lock the box and pin members together to prevent axial separation, dogs may be used to engage a groove in the pin.

A typical actuator device comprises a housing welded to the box member wherein the housing includes a threaded bore. A threaded actuator screw is located in the threaded bore. The threaded actuator screw has an annular enlargement or flange on its inner end rotatably disposed in a slot of an actuator pad or dog. The actuator pad is disposed in a radial opening in the box member and has an inner face curved to conform generally to the outer periphery of the grooves on the pin. At its outer end, the actuator screw has a non-circular or hexagonal head adapted to be engaged by a driving tool or wrench so that the pad may be shifted inwardly into locking engagement in the groove of the pin member, or the pad may be shifted outwardly to allow removal of the box member from the pin member.

A difficulty encountered with the traditional actuator device is that of disengaging a defective actuator screw. If the actuator screw is prevented from being removed from the actuator housing by galling of the actuator screw threads or other difficulties, then the dog will remain in locking engagement and the pin portion and box portion of adjacent joints are difficult to disengage.

BRIEF SUMMARY OF INVENTION

Therefore, it is an object of this invention to provide a riser dog screw with a fail safe mechanism. By providing a fail safe mechanism, the operator has an additional opportunity to remove the riser dog-style connection from the joint in the event that the actuator screw becomes unremovable.

The invention includes a dog-style connector for a marine riser system that connects a box portion and a pin portion of a riser. An actuator housing is affixed to an external surface of the box portion. The actuator housing has an outer bore and a threaded inner bore. An actuator body is threadably received in the inner bore. The actuator body has a hex head on its first end. The actuator body has a threaded fastener bore extending from the first end for receiving a threaded fastener. The actuator body has a second end that has a stem receptacle formed therein. The fastener bore is in communication with the stem receptacle. An actuator head, which includes a flange and a stem, is provided wherein the stem of the actuator head is positioned within the stem receptacle of the actuator body for sliding engagement therewith. Threads formed on the threaded fastener engage a second threaded fastener bore formed in the stem of the actuator head. A dog interfaces with the flange on the actuator head and is slidably mounted with respect to the actuator body for engaging a groove in the pin portion of a riser. A threaded fastener is provided to be threadably received in the threaded fastener bore of the actuator body and the second bore of the actuator head.

In operation, the threaded fastener is placed into the fastener bore in the actuator body. The threaded fastener passes through the fastener bore and into the second bore of the actuator head. The threaded fastener secures the actuator body to the actuator head. The actuator body and the actuator head are made to fit tightly to allow the correct transfer of preload forces to the dog segment. The hex head of the actuator body is then engaged and the actuator body is threaded into the actuator housing until the dog is forced into the grooves of the pin portion of the riser.

The actuator body may become difficult or impossible to remove from the actuator housing due to reasons such as galling of the threads that engage the actuator body with an insert positioned in the actuator housing. To remove an actuator body having galled threads, the retainer ring is removed from the actuator housing, thereby allowing the actuator body and actuator head assembly to lift the dog out of engagement with the pin. The threaded fastener may be rotated by means of a hex opening to disengage the actuator body from the actuator head so that the actuator body and insert may by removed and replaced.

BRIEF DESCRIPTION OF THE DRAWINGS

FIG. 5a is a perspective view of the actuator head having a polygonal stem that is shown in FIG. 4a.

DETAILED DESCRIPTION OF THE INVENTION

Figure 1:
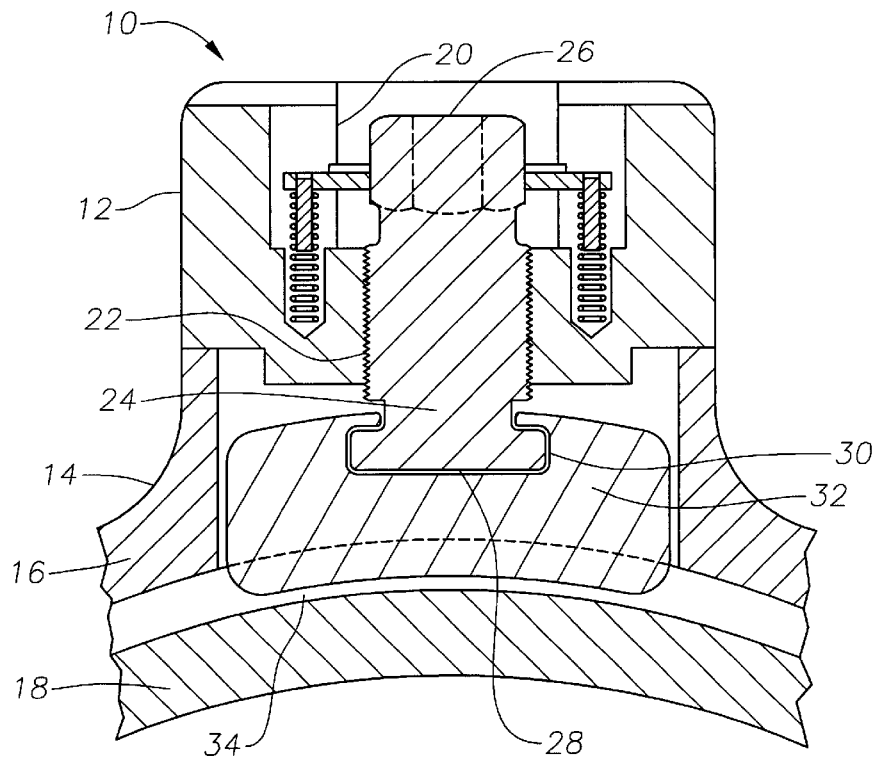
FIG. 1 is a top cross-sectional view of a prior art dog-style connection.

FIG. 1 shows a prior art dog connection 10. The dog connection 10 includes an actuator housing 12 that is affixed to an external surface 14 of a box portion 16 of a riser. The dog connection 10 connects box portion 16 with pin portion 18 of a riser.

An outer bore 20 is formed in the actuator housing 12. A threaded inner bore 22 is also formed in the actuator housing 12. An actuator screw 24 is threaded into inner bore 22. The actuator screw 24 has a hex head 26 that may be engaged by a socket or other device for inserting or removing actuator screw 24. On an opposite end of actuator screw 24 is actuator head 28. Actuator head 28 is inserted into an interface 30, preferably a T-slot interface formed in dog 32. Dog 32 is retracted or extended into recess 34 in pin portion 18. By extending dog 32 into recess 34, box portion 16 is affixed to pin portion 18.

A difficulty encountered with use of the prior art dog connection is that when the actuator screw 24 cannot be removed, then the box portion 16 and pin portion 18 may not be disengaged.

An improved dog connection 36 is provided (FIGS. 2–7). Dog connection 36 includes an actuator housing 38, which is affixed to an external surface 40 of box portion 42. The dog connection 36 connects box portion 42 with pin portion 44. Actuator housing 38 is provided with an outer bore 46 and a threaded inner bore 48. Insert 50 is positioned within inner bore 48. Insert 50 has internal threads 52 provided thereon. Insert 50 is affixed to actuator housing 38 by retainer ring 54. Retainer ring 54 has external threads that engage the threads of inner bore 48. Retainer ring 54 also has spaced apart drive holes 55 for being engaged by a tool. Retainer ring 54 has external threads 56 that engage the threaded surface of inner bore 48.

An actuator body 58 and actuator stem 70 are located within the actuator housing 38. A polygonal embodiment (FIG. 4a) and an eccentric embodiment (FIG. 4b) of actuator body 58 and actuator stem 70 (FIGS. 5a and 5b) are discussed below. Similar components are designated by the same numerals. Differing components are designated by the addition of an "a" or "b" following the corresponding numerals. Although an "a" or "b" distinguishes the components of the different embodiments in FIGS. 4a, 4b, 5a and 5b, the components are generically referenced in FIGS. 2, 3, 6 and 7 without the letter designations.

Figure 4A:
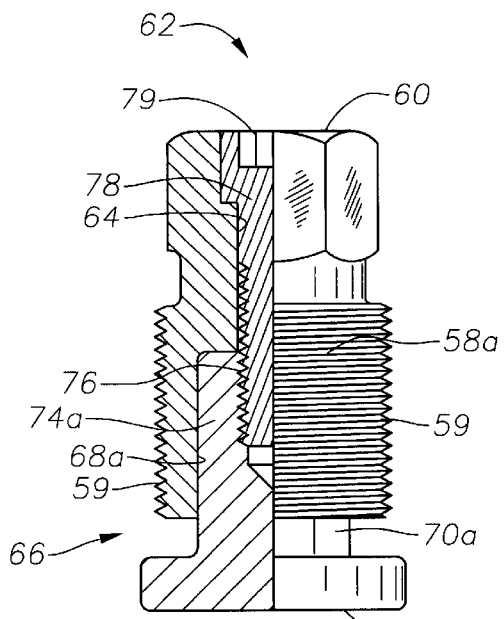
FIG. 4a is an enlarged partial elevational view and partial cross-sectional view of a first or polygonal embodiment of a riser dog actuator that is part of the dog-style connection of FIG. 2.

Referring now to FIG. 4a, the preferred, or polygonal actuator body 58a is shown. Actuator body 58a may be threaded into internal threads 52 of insert 50. Actuator body 58a has external threads 59. Actuator body 58a is provided with a hex drive head 60, which is for receiving a socket wrench or other device. Hex head 60 is formed on first end 62 of actuator body 58a. A fastener bore 64 is formed in first end 62. Actuator body 58a has a second end 66, which has a polygonal stem receptacle 68a therein. Polygonal stem receptacle 68a is smooth, i.e., is not a threaded receptacle.

Figure 2:
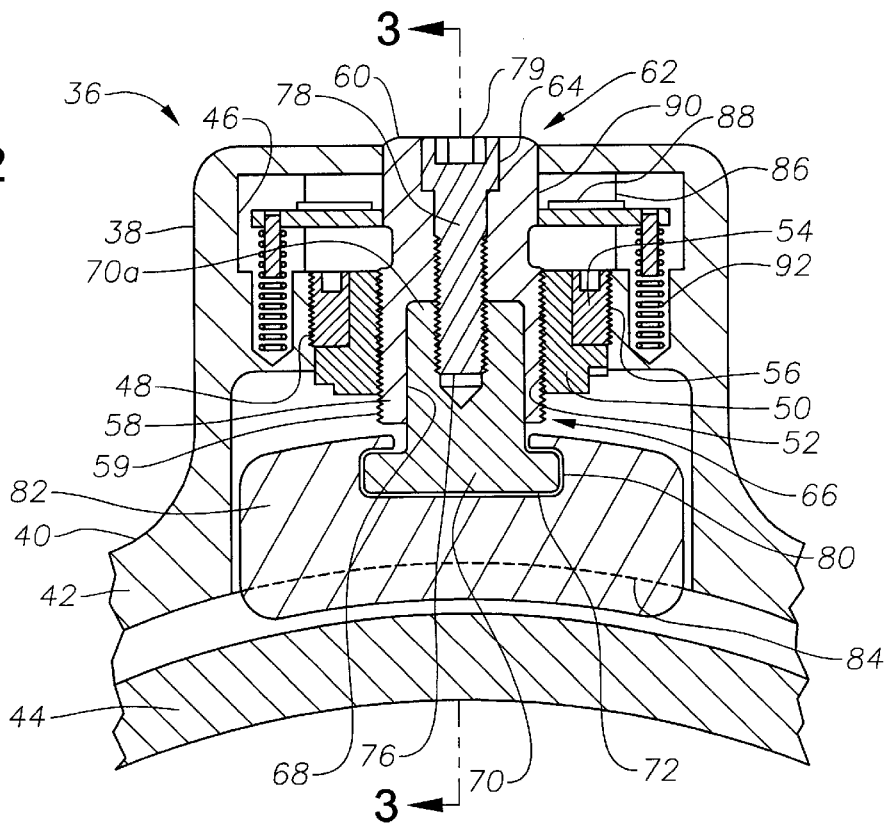
FIG. 2 is a top cross-sectional view of a dog-style connection of the invention.
Figure 3:
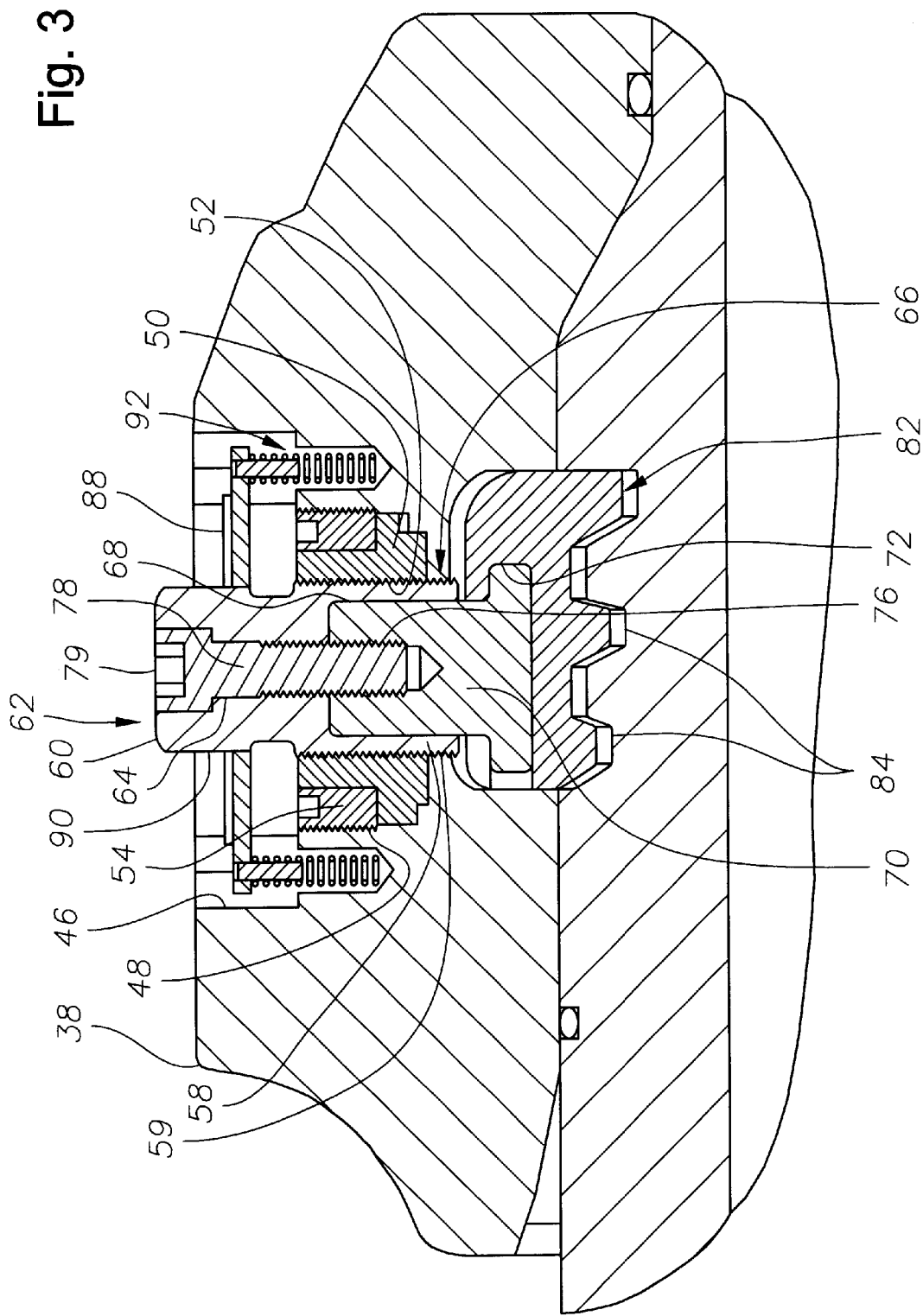
FIG. 3 is a side cross-sectional view of a dog-style connection of the invention, taken along the line 3—3 of FIG. 2.

An actuator head 70a (FIGS. 4a and 5a) is provided for sliding engagement with polygonal stem receptacle 68a. Actuator head 70a has a flange 72 on one end and a polygonal actuator stem 74a on another end. Preferably, polygonal shaped stem receptacle 68a and actuator stem 74a is hexagonal in cross-section. However, other configurations may be used to prevent relative rotation of actuator body 58a and actuator head 70a. Polygonal actuator stem 74a slidably engages polygonal stem receptacle 68a. A threaded fastener 78 is received in fastener bore 64 of actuator body 58a and threads into second fastener bore 76. Threaded fastener 78 has a hexagonal recess 79 for receiving a tool therein. Fastener bore 76 is threaded, therefore threaded fastener 78 secures actuator body 58a and actuator head 70a together. The head of threaded fastener 78 is enlarged and fits within a center bore in fastener bore 64 to secure actuator body 58a to actuator head 70a. Flange 72 of actuator head 70a engages a T-slot interface 80 of dog 82 (FIGS. 2 and 3). Actuator head 70a may be retracted or extended away from or towards grooves 84 in pin portion 44, thereby moving dog 82 for either locking together or releasing box portion 16 and pin portion 18.

Figure 4B:
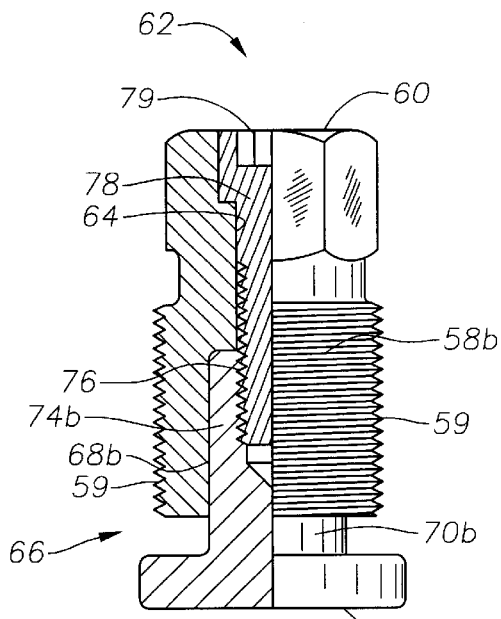
FIG. 4b is an enlarged partial elevational view and partial cross-sectional view of an alternate or eccentric embodiment of a riser dog actuator that is part of the dog-style connection of FIG. 2.
Figure 5A:
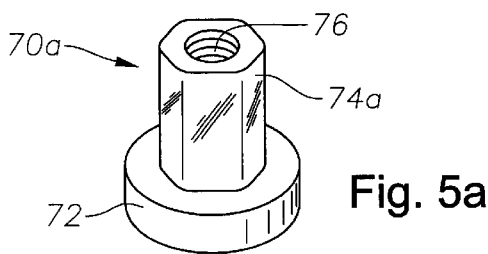
Figure 5B:
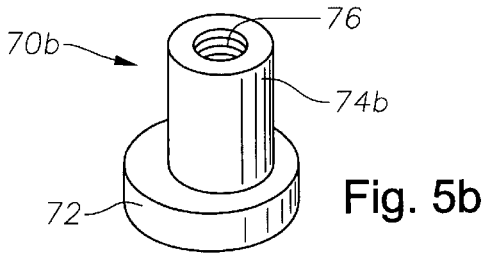
FIG. 5b is a perspective view of the actuator head having an eccentric stem that is shown in FIG. 5b.
Figure 6:
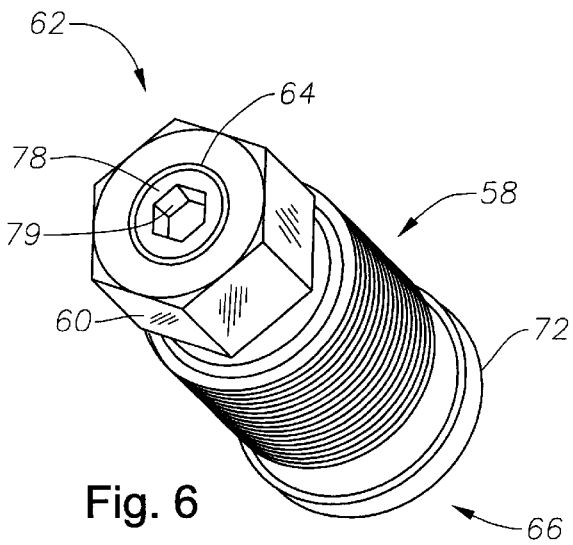
FIG. 6 is a perspective view of the riser dog actuator of FIGS. 4 and 5.
Figure 7:
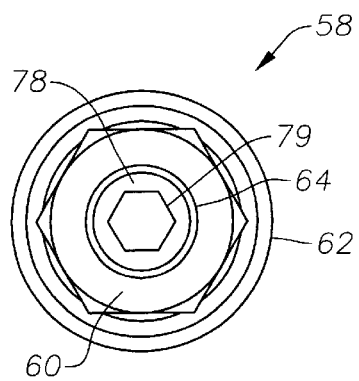
FIG. 7 is an end view of the riser dog actuator of FIGS. 4 and 5.

Referring now to FIG. 4b, an alternate, or eccentric actuator body 58b is shown. An actuator body 58b may be threaded into internal threads 52 of insert 50. Actuator body 58b has external threads 59. Actuator body 58b is provided with a hex drive head 60, which is for receiving a socket wrench or other device. Hex head 60 is formed on first end 62 of actuator body 58b. A fastener bore 64 is formed in first end 62. Actuator body 58b has a second end 66, which has a stem receptacle 68b therein. Stem receptacle 68b is smooth, i.e., is not a threaded receptacle.

An actuator head 70b (FIGS. 4b and 5b) is provided for sliding engagement with stem receptacle 68b. Actuator head 70b has a flange 72 on one end and an actuator stem 74b on another end. Actuator stem 74b slidably engages stem receptacle 68b. An eccentric fastener bore 76 passes into stem 74b of actuator head 70b. The axis of fastener bore 76 is offset from the axis of actuator head 70b. A threaded fastener 78 is received in fastener bore 64 of actuator body 58b and threads into second or eccentric fastener bore 76. Threaded fastener 78 has a hexagonal recess 79 for receiving a tool therein. Fastener bore 76 is threaded, therefore threaded fastener 78 secures actuator body 58b and actuator head 70b together. The head of threaded fastener 78 is enlarged and fits within a center bore in fastener bore 64 to secure actuator body 58b to actuator head 70b. Flange 72 of actuator head 70b engages a T-slot interface 80 of dog 82. (FIGS. 2 and 3) Actuator head 70b may be retracted or extended away from or towards grooves 84 in pin portion 44, thereby moving dog 82 for either locking together or releasing box portion 16 and pin portion 18.

Referring back to FIG. 2, radial slots 86 are formed within outer bore 46 of actuator housing 38. A lock plate 88 is retractably positioned within outer bore 46. Lock plate 88 has a hexagonal orifice 90 that compliments hex head 60 of actuator body 58. Springs 92 are provided to position lock plate 88 around hex head 60. Therefore, hexagonal orifice 90 prevents actuator body 58 from backing out of actuator housing 38 by vibration or other reasons.

In operation, threaded fastener 78 is placed into fastener bore 64 of actuator body 58 and threaded into fastener bore 76 of actuator head 70 by inserting a tool in hexagonal opening 79. Actuator body 58 and attached actuator head 70 are then positioned within the actuator housing 38. Flange 72 of actuator head 70 is engaged with T-slot interface 80 of dog 82. As actuator body 58 is threaded into internal threads 52 of insert 50 in actuator housing 38, dog 82 is extended towards groove 84 in pin portion 44. Once dog 82 bottoms out within groove 84, box portion 42 and pin portion 44 are locked together. Lock plate 88 is then allowed to spring into position around the hex head 60 of actuator body 58.

To unlock box portion 42 from pin portion 44, lock plate 88 is pressed inward to disengage it from hex head 60. A wrench engages hex head 60 to cause actuator body 58 to back out of internal threads 52 of insert 50 in actuator housing 38. This causes dog 82 to retract. Threaded fastener 78 will not unscrew from actuator head 70 while hex head 60 is being rotated because threaded fastener 78 is eccentric to actuator body 58.

If the internal threads 52 of insert 50 or external threads of actuator body 58 become galled thereby preventing actuator body 58 from being removed from actuator housing 38, then retainer ring 54 will be removed, thereby freeing insert 50 and actuator body 58. Insert 50 and actuator body 58 may then be retracted, thereby retracting dog 62 from groove 84. After retraction of dog 62, box portion 16 and pin portion 18 may be separated. Threaded fastener 78 is then removed, thereby disengaging actuator body 58 and actuator head 70. After separation and after threaded fastener 78 is removed, actuator body 58, insert 50, and retainer ring 54 may be removed and replaced.

This invention has significant advantages including allowing a frozen actuator body and retainer ring to be removed and replaced rather than having to cut the actuator body for removal.

What is claimed is:

1. A connector for connecting a box portion and a pin portion of a riser comprising:

an actuator housing affixed to the box portion and having a bore extending therethrough;

an insert containing a set of threads and releasably secured inside the bore;

an actuator having a set of external threads that engage the threads of the insert, said actuator having a flange on one end and a drive head on an opposite end for rotating the actuator relative to the insert;

a dog having a slot interface for receiving said flange, said dog for engaging the pin portion to affix the box portion to the pin portion; and a retainer secured in the bore for releasably retaining the insert, the retainer being releasable to allow the insert to be removed from the bore along with the actuator in the event the threads of the insert or the threads of the actuator become damaged.

2. The connector according to claim 1 wherein:

said actuator comprises an actuator body, an actuator stem, and a threaded fastener.

3. The connector according to claim 1 wherein:

said retainer has threads on an outside diameter that engage threads in the bore of said actuator housing.

4. The connector according to claim 1 wherein:

said retainer has threads on an outside diameter that engage threads in the bore of said actuator housing.

5. The connector according to claim 1 wherein:

said actuator comprises an actuator body, an actuator stem that is eccentrically offset from an axis of said actuator body, and a threaded fastener.

6. The connector according to claim 1 wherein:

said actuator comprises an actuator body, an actuator stem that is polygonal in cross-section, and a threaded fastener.

7. The connector according to claim 1 wherein:

said drive head is polygonal.

8. A connector for connecting a box portion and a pin portion of a riser comprising:

an actuator housing affixed to the box portion;

a bore extending through said actuator housing;

an actuator body threadably received within said bore, said actuator body having a fastener bore in a first end and a stem receptacle in a second end;

an actuator head comprised of a stem portion and a flange portion, said stem portion slidably received within said stem receptacle of said actuator body, said actuator head having a threaded head fastener bore on an end of said stem portion opposite said flange portion;

a threaded fastener threadably received within said actuator body fastener bore and extending within said head fastener bore for securing said actuator body to said actuator head; and a dog having a slot interface for receiving said flange portion, said dog for engaging the pin portion to affix the box portion to the pin portion.

9. The connector according to claim 8 further comprising:

an insert within said bore of said actuator housing, having a threaded insert bore that threadingly receives said actuator body; and a retainer secured in the actuator housing bore for releasably retaining the insert, the retainer being releasable to allow the insert to be removed from the bore along with the actuator body in the event the threads of the insert or the threads of the actuator body become damaged.

10. The connector according to claim 8 further comprising:

an insert within said bore of said actuator housing, having a threaded insert bore that threadingly receives said actuator body;

a retainer secured in the bore of said actuator housing for releasably retaining the insert, the retainer being releasable to allow the insert to be removed from the actuator housing bore along with the actuator body in the event the threads of the insert or the threads of the actuator body become damaged.

11. The connector according to claim 8, wherein said threaded fastener has an offset axis with respect to said actuator body.

12. A connector for connecting a box portion and a pin portion of a riser comprising:

an actuator housing affixed to the box portion;

a bore extending through said actuator housing;

an actuator body threadably received within said bore, said actuator body having a fastener bore in a first end and a stem receptacle in a second end;

an actuator head comprised of a stem portion and a flange portion, said stem portion slidably received within said stem receptacle of said actuator body, said actuator head having a threaded head fastener bore on an end of said stem portion opposite said flange portion;

an insert within said bore of said actuator housing, said insert having a threaded insert bore that threadingly receives said actuator body;

a threaded fastener threadably received within said actuator body fastener bore and extending within said actuating head fastener bore for securing said actuator body to said actuator head;

a dog having a slot interface for receiving said flange portion, said dog for engaging the pin portion to affix the box portion to the pin portion; and a retainer secured in the bore for releasably retaining the insert, the retainer being releasable to allow the insert to be removed from the bore along with the actuating body in the event the threads of the insert or the threads of the actuator body become damaged.

13. The connector according to claim 12, wherein said threaded fastener has an offset axis with respect to said actuator body.

* * * * *